United States Patent
Arvidsson et al.

(10) Patent No.: US 8,061,762 B2
(45) Date of Patent: Nov. 22, 2011

(54) VEHICLE DOOR AND A SIDE IMPACT BEAM

(75) Inventors: Stefan Arvidsson, Pitea (SE); Petrus Hedlund, Overtomea (SE); Hans Bodin, Sunderbyn (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 12/310,274

(22) PCT Filed: Aug. 17, 2007

(86) PCT No.: PCT/SE2007/000729
§ 371 (c)(1),
(2), (4) Date: Feb. 18, 2009

(87) PCT Pub. No.: WO2008/033066
PCT Pub. Date: Mar. 20, 2008

(65) Prior Publication Data
US 2009/0322117 A1 Dec. 31, 2009

(30) Foreign Application Priority Data

Sep. 11, 2006 (SE) .................................. 0601858

(51) Int. Cl.
*B60J 5/04* (2006.01)
*B60J 5/00* (2006.01)
(52) U.S. Cl. .................................................. 296/146.6
(58) Field of Classification Search ............. 296/187.05, 296/146.1, 146.5, 146.6, 202, 207, 203.03, 296/193.05, 187.01, 187.03, 187.04, 107.12; 180/271, 274; 280/735
See application file for complete search history.

(56) References Cited

U.S. PATENT DOCUMENTS

| | | | | | |
|---|---|---|---|---|---|
| 4,684,166 | A | * | 8/1987 | Kanodia | 296/146.6 |
| 5,080,427 | A | * | 1/1992 | Sturrus et al. | 296/187.12 |
| 5,281,780 | A | * | 1/1994 | Haland | 200/52 R |
| 5,307,896 | A | * | 5/1994 | Taguchi et al. | 180/274 |
| 5,316,336 | A | * | 5/1994 | Taguchi et al. | 280/730.2 |
| 6,196,619 | B1 | * | 3/2001 | Townsend et al. | 296/146.6 |
| 6,441,623 | B1 | * | 8/2002 | Moon | 324/661 |
| 6,685,218 | B1 | * | 2/2004 | Breed et al. | 280/730.2 |
| 7,086,686 | B2 | * | 8/2006 | Bullmann et al. | 296/146.6 |
| 7,093,886 | B2 | * | 8/2006 | Blust et al. | 296/146.6 |
| 7,331,626 | B2 | * | 2/2008 | Yoshimoto et al. | 296/187.12 |
| 7,334,657 | B2 | * | 2/2008 | Breed et al. | 180/274 |
| 2002/0069609 | A1 | * | 6/2002 | Nees et al. | 52/735.1 |
| 2004/0026957 | A1 | * | 2/2004 | Bodin et al. | 296/146.6 |
| 2004/0036316 | A1 | * | 2/2004 | Bodin et al. | 296/146.6 |
| 2005/0081479 | A1 | * | 4/2005 | Tjoelker et al. | 52/741.1 |
| 2005/0253415 | A1 | * | 11/2005 | Bodin et al. | 296/146.6 |

FOREIGN PATENT DOCUMENTS

| | | |
|---|---|---|
| EP | 0523704 A1 | 1/1993 |
| EP | 1671827 A2 | 6/2006 |
| GB | 2272670 A | 5/1994 |

* cited by examiner

*Primary Examiner* — Glenn Dayoan
*Assistant Examiner* — Sunsurraye Westbrook
(74) *Attorney, Agent, or Firm* — Mark P. Stone

(57) ABSTRACT

A vehicle door has an impact protection beam (12) which bears a sensor (20) for releasing one or more impact cushions. The beam (12) is a hat beam with its concave side facing towards the interior of the vehicle, and a fitting hole (18) in the central flange (12) for fitting the sensor (20) within the beam. One of the hat beam's webs (13) has clip holes for fitting the sensor's cabling along the beam.

16 Claims, 2 Drawing Sheets

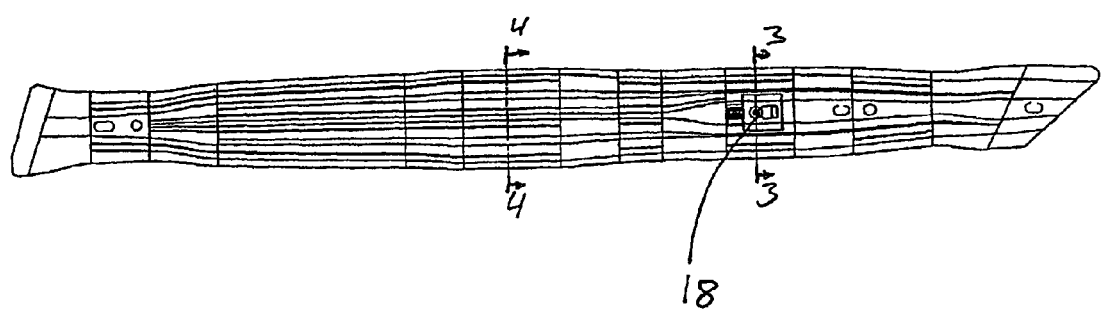
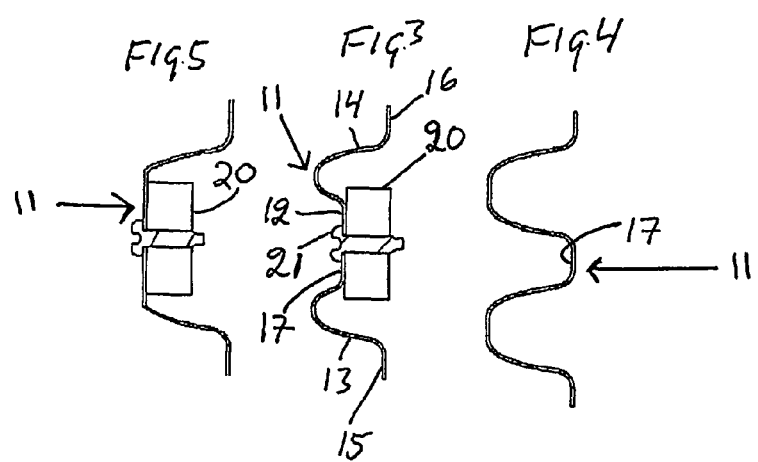

VEHICLE DOOR AND A SIDE IMPACT BEAM

TECHNICAL FIELD

The present invention relates to an impact protection beam for a vehicle door, whereby the beam is intended to bear a sensor for releasing one or more side impact cushions, and it also relates to a vehicle door with such a beam which bears a sensor.

STATE OF THE ART

EP 1671827 A2 refers to such an impact protection beam which has a hat-shaped profile and has a side flange broadened to a flap which bears the sensor.

OBJECT AND BRIEF DESCRIPTION OF THE INVENTION

An object of the invention is to provide reliable operation for a sensor for an impact cushion by improved fastening of the sensor. Another object is to reduce the manufacturing cost of the impact protection beam on which the sensor is to be mounted.

This is achieved by giving the beam a generally open U-shaped cross-section with its concave side facing towards the interior of the vehicle, and fastening means for fitting the sensor within the beam. The beam is with advantage a hat beam with a fitting hole in the central flange for fastening the sensor, and the webs of the beam have with advantage a plurality of holes for fastening the sensor's cabling along the beam. Situating the sensor centrally in the beam and within the beam obviates the need for the beam to be rotationally rigid, since any twisting of the beam which may occur when the door is slammed hard cannot result in the sensor triggering the impact cushion, which might happen if the sensor was situated far from the beam's mass centre.

Situating the sensor within the beam and in contact with the beam's outermost portion also means that it comes closer to the door's outer panel and reacts quicker upon impact.

Neither the central location of the sensor within the beam nor the provision in the webs of fitting holes for cabling affect the width of material and thereby increase the material cost. The webs are not subject to tensile stress upon impact in the same way as the side flanges and therefore the risk of cracking is reduced as compared with cases where the cabling is fastened to a side flange.

The invention is defined by the claims.

BRIEF DESCRIPTION OF THE DRAWINGS

FIG. 2 is a sideview of an impact beam which in FIG. 1 is shown fastened in the inner panel.

FIG. 3 is a cross-section along the line 3-3 in FIG. 2.

FIG. 4 is a cross-section along the line 4-4 in FIG. 2.

FIG. 5 corresponds to FIG. 4 but depicts an alternative embodiment.

DESCRIPTION OF THE ILLUSTRATED AND PREFERRED EMBODIMENT EXAMPLE

Figure 1:
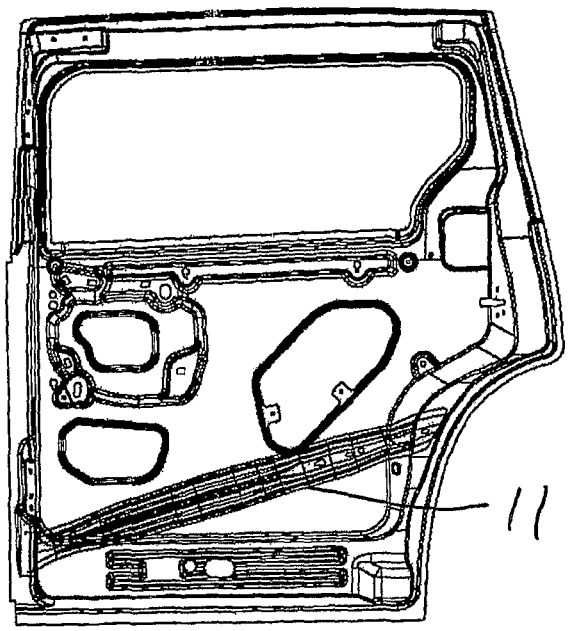
FIG. 1 is a sideview of an inner panel of a vehicle door as seen from inside the vehicle.

FIG. 1 depicts the inner panel of a conventional right rear door for a vehicle. The inner panel is the door's supporting member and has an outer panel fastened to its outside and a trim on its inside. The door's various parts, e.g. window guides and window motor, are situated within the inner panel. A side impact protection beam 11 is fastened between the forward and rear ends of the inner panel in such a way that it is situated inside the internal parts of the door close to the trim. Alternatively, the side beam may be fastened in such a way as to be situated close to the outer panel.

Figure 6:
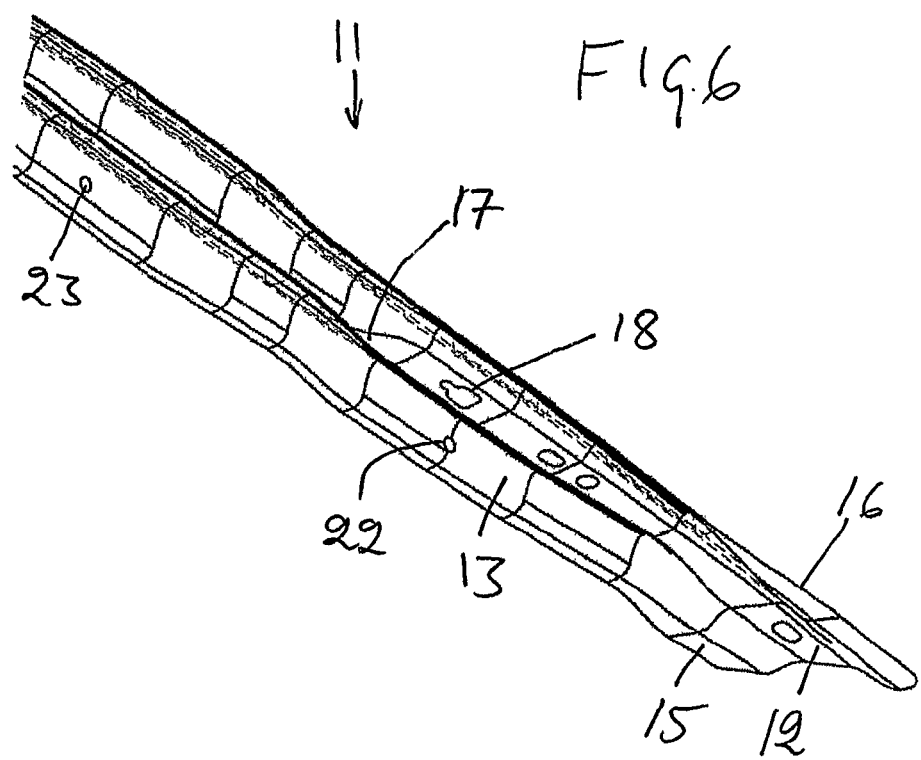
FIG. 6 is a perspective view of one end of the impact beam depicted in the above drawings.

The beam 11 has a hat profile with a central flange 12 (base of the beam), two webs 13,14 and two side flanges 15,16, as may best be seen in FIGS. 3 and 4. The central flange 12 faces outwards from the vehicle, i.e. the beam is of generally U-shaped cross-section with its concave side facing towards the interior of the vehicle. The beam is of varying profile along its length and the central flange 12 has a middle groove 17 which reaches to the level of the side flanges. The middle groove is less deep at the ends of the beam and disappears totally at the fastening portions of the beam, i.e. at the beam's outermost ends. The rear portion of the central flange 12 has a keyhole-shaped fastening hole (fitting hole) 18, and a sensor 20 is clamped directly to the inside of the central flange by a fastening element in the form of a screw 21 which extends through the fastening hole. The screw may with advantage be adapted to being capable of being turned from both of its ends. At one end it has a head and the other end is, for example, hexagonal so that the screw can be unfastened from inside. The sensor 20 is coupled to trigger one or more side impact cushions. It is of advantage that the sensor is positioned as depicted, i.e. in the region of the passenger's hip, i.e. at the rear edge of the door, be it a forward door or a rear door. The cabling from the sensor has to be run to the hinge side of the door, i.e. the forward edge of the door, and one of the beam's webs has a number of holes 22,23 for clips as depicted in FIG. 6 to make it possible to fasten the cabling along the beam.

Situating the clip holes in the beam minimises the risk of cracking which might start from the clip holes when the beam deforms upon side impact. Both the sensor and its cabling are readily accessible for servicing when the trim is removed.

FIG. 5 depicts an alternative version of the beam's cross-section wherein the central flange 12 has no middle groove at all at the sensor fastening. It may also be completely devoid of any middle groove. The external appearance of the beam may also be different.

The invention claimed is:

1. A vehicle door with an impact protection beam (11) which bears a sensor (20) for releasing one or more side impact cushions, characterized in that the beam (11) has, at least at the sensor fastening, a generally open U-shaped cross-section with its concave side facing towards the interior of the vehicle, and the sensor (20) is fitted within the U-shaped cross-section of the beam.

2. A vehicle door according to claim 1, characterised in that the beam is a hat beam with a central flange (12), two webs, (13, 14) and side flanges (15, 16), and the sensor (20) is fixed to the central flange.

3. A vehicle door according to claim 2, characterised in that the sensor is fixed to the central flange by a fastening element (21) which extends through a fastening hole (18) in the central flange.

4. A vehicle door according to claim 2, characterised in that one of the beam's webs (13) has a plurality of holes (22, 23) for fastening the sensor's cabling along the web.

5. An impact beam for a vehicle door, whereby the beam (11} bears a sensor (20) for releasing one or more impact cushions, characterized in that the beam (11) has a generally open U-shaped cross-section with its concave side facing towards the interior of the vehicle, and fastening means (18, 21) for fitting the sensor (20) within the U-shaped cross-section of the beam.

6. An impact protection beam according to claim 5, characterised in that the sensor is fixed in contact with the base of the beam.

7. An impact protection beam according to claim 5, characterised in that the beam is a hat beam with a central flange (12), two webs (13, 14) and side flanges (15, 16), and the sensor (20) is fitted in the central flange (12).

8. An impact protection beam according to claim 6, characterised in that one of the beam's webs (13) has a plurality of holes (22, 23) for fastening the sensor's cabling along the web.

9. An impact protection beam according to claim 6, characterised in that the central flange (12) has a fastening hole (18) for fastening the sensor (20) by means of a fastening element (21) extending through the hole.

10. A vehicle door according to claim 3, characterised in that one of the beam's webs (13) has a plurality of holes (22, 23) for fastening the sensor's cabling along the web.

11. An impact protection beam according to claim 6, characterised in that the beam is a hat beam with a central flange (12), two webs (13, 14) and side flanges (15, 16), and the sensor (20) is fitted in the central flange (12).

12. An impact protection beam according to claim 7, characterised in that one of the beam's webs (13) has a plurality of holes (22, 23) for fastening the sensor's cabling along the web.

13. An impact protection beam according to claim 7, characterised in that the central flange (12) has a fastening hole (18) for fastening the sensor (20) by means of a fastening element (21) extending through the hole.

14. An impact protection beam according to claim 8, characterised in that the central flange (12) has a fastening hole (18) for fastening the sensor (20) by means of a fastening element (21) extending through the hole.

15. An impact protection beam according to claim 11, characterised in that the central flange (12) has a fastening hole (18) for fastening the sensor (20) by means of a fastening element (21) extending through the hole.

16. An impact protection beam according to claim 12, characterised in that the central flange (12) has a fastening hole (18) for fastening the sensor (20) by means of a fastening element (21) extending through the hole.

* * * * *